US006523263B2

(12) United States Patent
Jo et al.

(10) Patent No.: US 6,523,263 B2
(45) Date of Patent: Feb. 25, 2003

(54) CHARGE ROLLER OF DEVELOPING DEVICE FOR IMAGE FORMING APPARATUS, METHOD FOR FABRICATING THE SAME AND TOOL FOR FABRICATING CHARGE ROLLER

(75) Inventors: Hae-Seog Jo, Suwon (KR); Hee-Won Jung, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 108 days.

(21) Appl. No.: 09/725,089

(22) Filed: Nov. 29, 2000

(65) Prior Publication Data

US 2001/0002382 A1 May 31, 2001

(30) Foreign Application Priority Data

Nov. 29, 1999 (KR) ........................................ 1999-53498

(51) Int. Cl.[7] ................................................ B23P 15/00

(52) U.S. Cl. .................. 29/895.32; 29/895.3; 29/527.2; 264/262

(58) Field of Search ........................... 29/895.32, 895.3, 29/527.1, 530; 428/36.5, 36.91, 317.9, 319.3; 492/53, 56; 264/262, 276; 399/176

(56) References Cited

U.S. PATENT DOCUMENTS

| | | | | | |
|---|---|---|---|---|---|
| 5,600,414 | A | * | 2/1997 | Hyllberg | 361/225 |
| 5,707,326 | A | * | 1/1998 | Hyllberg | 492/49 |
| 5,786,091 | A | * | 7/1998 | Kurokawa et al. | 361/221 |
| 5,792,533 | A | * | 8/1998 | Kurokawa et al. | 399/176 |
| 5,993,912 | A | * | 11/1999 | Yoo | 29/895.32 |
| 6,099,673 | A | * | 8/2000 | Van Bennekom | 156/187 |
| 6,440,347 | B1 | * | 8/2002 | Izawa et al. | 264/262 |
| 2002/0115546 | A1 | * | 8/2002 | Park | 492/56 |

* cited by examiner

*Primary Examiner*—I Cuda-Rosenbaum
(74) *Attorney, Agent, or Firm*—Robert E. Bushnell, Esq.

(57) ABSTRACT

A method of manufacturing a charge roller utilizes a foam rubber substance where epichlorohydrin oxide rubber and an acrylonitrile butadiene rubber are mixed at a ratio of 5:95, or utilizing a crosslinking rubber substance consisting of epichlorohydrin oxide rubber and acrylonitrile butadiene rubber having a polar low molecular polymeric characteristic, thus allowing the charge roller to maintain a low volume resistivity of $10^7$ Ω cm to $10^8$ Ω cm. As a result, the surface of a photosensitive drum can be charged by a minimum charging voltage, to thereby significantly reduce an amount of ozone. A method of manufacturing a charge roller employs peroxide as a cross linking agent for rapidly cross-linking molecular chains between an epichlorohydrin oxide rubber and acrylonitrile butadiene rubber forming a main composition of a foam rubber substance.

Since a non-crosslinked low molecular polymeric substance existing at a resilient rubber is significantly reduced, the low molecular polymeric substance of the charge roller may not be migrated onto a surface of the photosensitive drum even if the charge roller is in contact with a photosensitive drum for a long time period during a stoppage of operation of an image forming apparatus, As a result, the charge roller may not cause an abnormal phenomenon on the surface of the photosensitive drum.

39 Claims, 9 Drawing Sheets

CHARGE ROLLER OF DEVELOPING DEVICE FOR IMAGE FORMING APPARATUS, METHOD FOR FABRICATING THE SAME AND TOOL FOR FABRICATING CHARGE ROLLER

CLAIM OF PRIORITY

This application makes reference to, incorporates the same herein, and claims all rights accruing thereto under 35 U.S.C. 119 through our patent application entitled *Charge Roller For A Developing Device Of An Image Forming Apparatus And Method For Fabricating The Same And Tool For Fabricating The Charge Roller* earlier filed in the Korean Industrial Property Office on the day of Nov. 29, 1999 and there duly assigned Ser. No. 1999/53498.

BACKGROUND OF THE INVENTION

1. Field of the Invention

The present invention relates to a charge roller of a developer for use of an image forming apparatus adopting an electrophotographic printing system, and more particularly, to a charge roller of a developer for an image forming apparatus in which a semiconductive resilient rubber layer is formed of a double layer constituted by a foam rubber layer and a non-foam rubber layer, or a single layer of a cross linking rubber layer, to thereby minimize volume resistivity of the semiconductive resilient rubber layer, maximize crosslinking ratio of molecule of rubber, and suppress increase of durability of the semiconductive resilient rubber layer. Further, the present invention relates to a method of manufacturing such a charge roller and a receptor device employed for such a method.

2. Background Art

In general, an image forming apparatus adopting an electrophotographic printing system, for example, laser printer, facsimile apparatus, copier or similar image forming apparatus, is provided with a developer having a photosensitive drum and a developing roller. A photosensitive drum is formed with at an outer periphery thereof an electrostatic latent image via an exposer, and supplied with a toner via an adjacent developing roller, and develops the electrostatic latent image into a visual image using a toner, thereby forming an image onto a recording medium.

A conventional developer for an image forming apparatus is disclosed in U.S. Pat. No. 5,132,734 "Developing apparatus", U.S. Pat. No. 5,260,748 *"Electrostatic image developer dispenser"*, U.S. Pat. No. *"Developing device for an image forming apparatus"*, U.S. Pat. No. 5,771,426 *"Developing device using a toner and carrier mixture"*, and U.S. Pat. No. 5,787,328 *"Rotary developing device for an image forming apparatus"*.

In such a conventional developer for an image forming apparatus, a charge roller is generally disposed in the vicinity of a photosensitive drum so as to rotate at a constant speed, being engaged with the photosensitive drum. Here, if the charge roller is applied with a voltage having a predetermined size, so-called "Paschen discharge" occurs, and the surface of the photosensitive drum which is in contact with the charge roller is electrostatically charged according to a relation among resistance and surface state of the charge roller and the voltage applied.

A conventional charge roller is disclosed in U.S. Pat. No. 5,499,078 *"Charge roller and image forming apparatus using the same"*, U.S. Pat. No. 5,600,414 *"Charging roller with blended ceramic layer"*, U.S. Pat. No. 5,768,653 *"Electrophotographic printing device with a charging roller"*, U.S. Pat. No. 5,792,533 *"Electrostatic charging roller"*, and U.S. Pat. No. 5,852,758 *"Charge roller displacement mechanism"*.

A conventional charge roller has a configuration in that a metallic rod has an outer periphery pressedly coated with a semiconductive resilient rubber with a low durability so that a photosensitive drum may have a uniformly charged surface.

Recently, it has been established through a variety of studies on the structure of a charge roller that a semiconductive resilient rubber should maintain a volume resistivity of $10^7$ Ω cm to $10^8$ Ω cm to allow a photosensitive drum to have a uniformly charged surface contacting a charge roller.

However, it is extremely difficult to produce a charge roller with an excellent quality unless an additional treatment is conducted to a semiconductive resilient rubber since a semiconductive resilient rubber constituting an outer surface of a charge roller has its own volume resistivity of $10^8$ Ω cm or higher.

If a charge roller with a volume resistivity of $10^8$ Ω cm or higher contacts a photosensitive drum, an excessively high voltage is required for charging the surface of the photosensitive drum. Thus, an amount of ozone generated by the applied high voltage significantly increases, resulting in a serious environmental pollution.

Considering such characteristics of semiconductive resilient rubber, a variety of techniques for reducing a volume resistivity of a semiconductive resilient rubber are sought in a conventional system.

For example, U.S. Pat. No. 5,637,395 *"Powder coated charge roller"* discloses a method of adding an additive like a conductive carbon powder or alkali metal salt to a semiconductive resilient rubber so as to reduce a volume resistivity of the semiconductive resilient rubber.

Another example shows a method of replacing a semiconductive resilient rubber by an acrylonitrile butadiene rubber or epichlorohydrin rubber.

In addition to the above-mentioned approaches for reducing volume resistivity of a semiconductive resilient rubber, some different approaches have been proposed for enhancing characteristics of a semiconductive resilient rubber.

For example, U.S. Pat. No. 5,497,219 *"Charge rollers having improved layer structure and/or surface characteristics in an image forming apparatus"* and U.S. Pat. No. 5,786,091 *"Charge roller for an image forming apparatus"* disclose a method of coating a surface of a semiconductive resilient rubber with polyamide, fluoric resin, or epichlorohydrin rubber liquid utilizing a spraying or dipping system so that the semiconductive resilient rubber may have a desirable thickness and surface roughness.

U.S. Pat. No. 5,248,560 *"Filled urethane developer roller"* describes a method of replacing a semiconductive resilient rubber by a polyurethane rubber having superior abrasion resistance and electrical characteristic.

However, many problems arise from those known approaches when applied to practice, as follows.

First, with the above-mentioned method disclosed in U.S. Pat. No. 5,637,395, it is extremely difficult to uniformly disperse an additive like a conductive carbon powder or alkali metal salt onto a semiconductive resilient rubber.

In this case, since the uniformity of the additive applied to the semiconductive resilient rubber is extremely poor, an overall volume resistivity of the semiconductive resilient rubber becomes non-uniform. Accordingly, an overall surface of a photosensitive drum contacting the semiconductive resilient rubber is non-uniformly charged, resulting in an undesirable image being produced.

In case where an additive is added, the durability of a semiconductive resilient rubber rapidly increases, and it will be difficult to maintain the durability of the semiconductive resilient rubber at 40 or less as prescribed by JISA (Japanese Industrial Standards type AK6301). Moreover, if a diameter of a charge roller is reduced at such a state, it will be extremely difficult to ensure a uniform contact between the charge roller and the photosensitive drum. As a result, it will be difficult to reduce the size of the charge roller.

The approaches presented in U.S. Pat. Nos. 5,497,219 and 5,786,091 require a coating process utilizing coating liquid like polyamide, fluoric resin, or epichlorohydrin rubber in addition to a process of forming a semiconductive resilient rubber at an outer periphery of a metal rod, thus significantly deteriorating an overall product process efficiency.

Moreover, the process of coating such liquid makes it difficult to maintain at a low durability of the semiconductive resilient rubber similarly to the case of adding an additive. This will also make it difficult to reduce a size of a charge roller.

The approach disclosed in U.S. Pat. No. 5,248,560 allows a relatively higher quality charge roller to be produced, it is still problematic from the overall production cost aspect since a high price polyurethane is employed for this approach.

If a semiconductive resilient rubber is replaced by an acrylonitrile butadiene rubber or epichlorohydrin rubber having a low volume resistivity, the completed product may have an outer rubber surface having a volume resistivity suppressed down to a level lower than a predetermined level. However, it will be extremely difficult to maintain the durability of the outer rubber surface at 10 or less as prescribed by JISA. Moreover, if a diameter of a charge roller is reduced at such a state, it will be extremely difficult to ensure a uniform contact between the charge roller and the photosensitive drum. As a result, it will be difficult to reduce the size of the charge roller.

In addition, such a polar synthetic rubber like an epichlorohydrin rubber has characteristics where a large amount of non-crosslinked low molecular polymeric substance exists at a surface of the rubber. Therefore, if a charge roller having a rubber outer surface made of such polar synthetic rubber is in contact with a photosensitive drum during stoppage of operation of image forming apparatus, the low molecular polymeric substance constituting the charge roller is likely to be migrated to a surface of the photosensitive drum. As a result, an abnormal phenomenon may occur in that an image may not be formed onto the surface of the photosensitive drum.

As a method of suppressing such an abnormal phenomenon, efforts have been made to maximize the crosslinkage density of the outer rubber surface. However, this method still increases durability of outer rubber surface while reducing the above-mentioned abnormal phenomenon, and it will be difficult to reduce the size of the charge roller.

SUMMARY OF THE INVENTION

Therefore, it is an object of the present invention to uniformly charge a surface of a photosensitive drum contacting a resilient rubber while maintaining a volume resistivity of the resilient rubber constituting outer surface of a metal rod at $10^7$ Ω cm to $10^8$ Ω cm.

It is another object of the present invention to uniformly maintain volume resistivity of a resilient rubber at $10^7$ Ω cm to $10^8$ Ω cm while simplifying an overall product process.

It is still another object of the present invention to minimize voltage required for a charge roller to charge a surface of a photosensitive drum while maintaining a volume resistivity of a resilient rubber at $10^7$ Ω cm to $10^8$ Ω cm.

It is further still another object of the present invention to significantly reduce an amount of ozone by minimizing a charge voltage of a charge roller required for charging a surface of a photosensitive drum.

It is further still another object of the present invention to achieve a uniform image while maintaining uniform charged state of a photosensitive drum.

It is further still another object of the present invention to reduce a size of a charge roller while minimizing durability of a resilient rubber constituting an outer surface of a metal rod.

It is further still another object of the present invention to prevent an abnormal phenomenon from being occurred at a surface of a photosensitive drum even if a charge roller contacts for a long time period during a stoppage of operation of an image forming apparatus while minimizing a non-crosslinked low molecular polymeric substance existing at a resilient rubber.

It is still further an object of the present invention to enhance the quality of printing image by allowing an image composition for OA (office automated) machines, such as ink or toner to have metallic gloss revelation capability using organic synthesis metallic material instead of inorganic pigment.

To accomplish the above objects, there is provided a receptor device for an exclusive use in manufacturing a charge roller, the receptor device including a pipe-shaped main body having both ends opened so as to define a receipt space, and a pair of plugs inserted into the both ends of the main body for sealing the receipt space. Here, the main body of the receptor device is made of high molecular polymeric substance with a low thermal conductivity.

A metal rod pressedly-coated with a foam rubber consisting of epichlorohydrin oxide rubber, acrylonitrile butadiene rubber, filler, cross linking agent, and a blowing agent is loaded into the receipt space of the receptor device. Subsequently, the receptor device loaded with the metal rod is loaded again into a dry heating furnace, and the foam rubber is heated at a temperature of 130 C. to 150° C.

When such a heating process is performed for a selected time period, for example, 15 minutes to 25 minutes, the foam rubber is blown by the blowing agent thus filling the receipt space of the receptor device. Here, since the main body of the receptor device is made of a polymeric substance with a low thermal conductivity, an outer surface of the foamed rubber contacting an inner wall of the receipt space becomes a semiconductive non-foamed rubber layer while an inner surface of the foamed rubber which does not contact the inner wall of the receipt space becomes a semiconductive foamed rubber layer.

Subsequently, the main body of the receptor device is disassembled, and the metal rod coated with the foam rubber substance is transported outside and loaded into a dry heating furnace so as to heat the foam rubber substance at a selected temperature, for example, 130° C. to 150° C.

Then, the metal rod pressedly-coated with foam rubber substance is cut into a selected width, thereby completing a process of producing a charge roller of a developer for use in an image forming apparatus. The charge roller produced according to an embodiment of the present invention consists of a metal rod, a semiconductive foamed rubber layer surrounding an outer periphery of the metal rod, and a semiconductive non-foamed rubber layer surrounding an outer periphery of the semiconductive foamed rubber layer.

In the present invention, the rubber layer constituting an outer periphery of the metal rod may have a volume resistivity of $10^7$ Ω cm to $10^8$ Ω cm owing to an action of the epichlorohydrin oxide rubber and acrylonitrile butadiene rubber. Therefore, the charge roller produced according to the process of the present invention is capable of sufficiently charging a photosensitive drum utilizing a small sized charging voltage.

Meanwhile, a charge roller of a developer for use of an image forming apparatus can be produced in accordance with another embodiment of the present invention. If such is a case, a compression molding machine is employed for coating an outer periphery of a metal rod with a crosslinked rubber substance consisting of epichlorohydrin oxide rubber, acrylonitrile butadiene rubber, and a cross linking agent. Here, the cross linking agent is made up of a peroxide consisting of dicumyl peroxide and benzoyl peroxide.

Subsequently, the metal rod coated with the crosslinked rubber substance is loaded into a dry heating furnace so as to heat the crosslinked rubber substance at a selected temperature, say, 140° C. to 150° C. If such a heating process is performed for a selected time period, for example, 55 minutes to 65 minutes, the epichlorohydrin oxide rubber and acrylonitrile butadiene rubber contained in the crosslinked rubber substance form a peroxide crosslinkage due to an action of the cross linking agent.

Subsequently, the heated crosslinked rubber substance is heated again at a selected temperature, for example, 100° C. to 120° C. After performing such a heating process for a selected time period, say, 4 hours to 12 hours, the residual crosslinking agent which did not join the crosslinking process is completely removed.

Then, the metal rod pressedly-coated with the crosslinked rubber substance is cut into a predetermined width, thereby completing a process of producing a charge roller of a developer for use of an image forming apparatus. A charge roller produced according to an embodiment of the present invention consists of a metal rod and a crosslinked rubber layer surrounding an outer periphery of the metal rod.

In another embodiment of the present invention, the rubber layer constituting an outer periphery of the metal rod may have a volume resistivity of $10^7$ Ω cm to $10^8$ Ω cm owing to an action of the epichlorohydrin oxide rubber and acrylonitrile butadiene rubber. Therefore, the charge roller produced according to the process of the present invention is capable of sufficiently charging a photosensitive drum utilizing a small sized charging voltage.

The above and other objects, features and advantages of the present invention will become more apparent from the following description taken in conjunction with the accompanying drawings.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
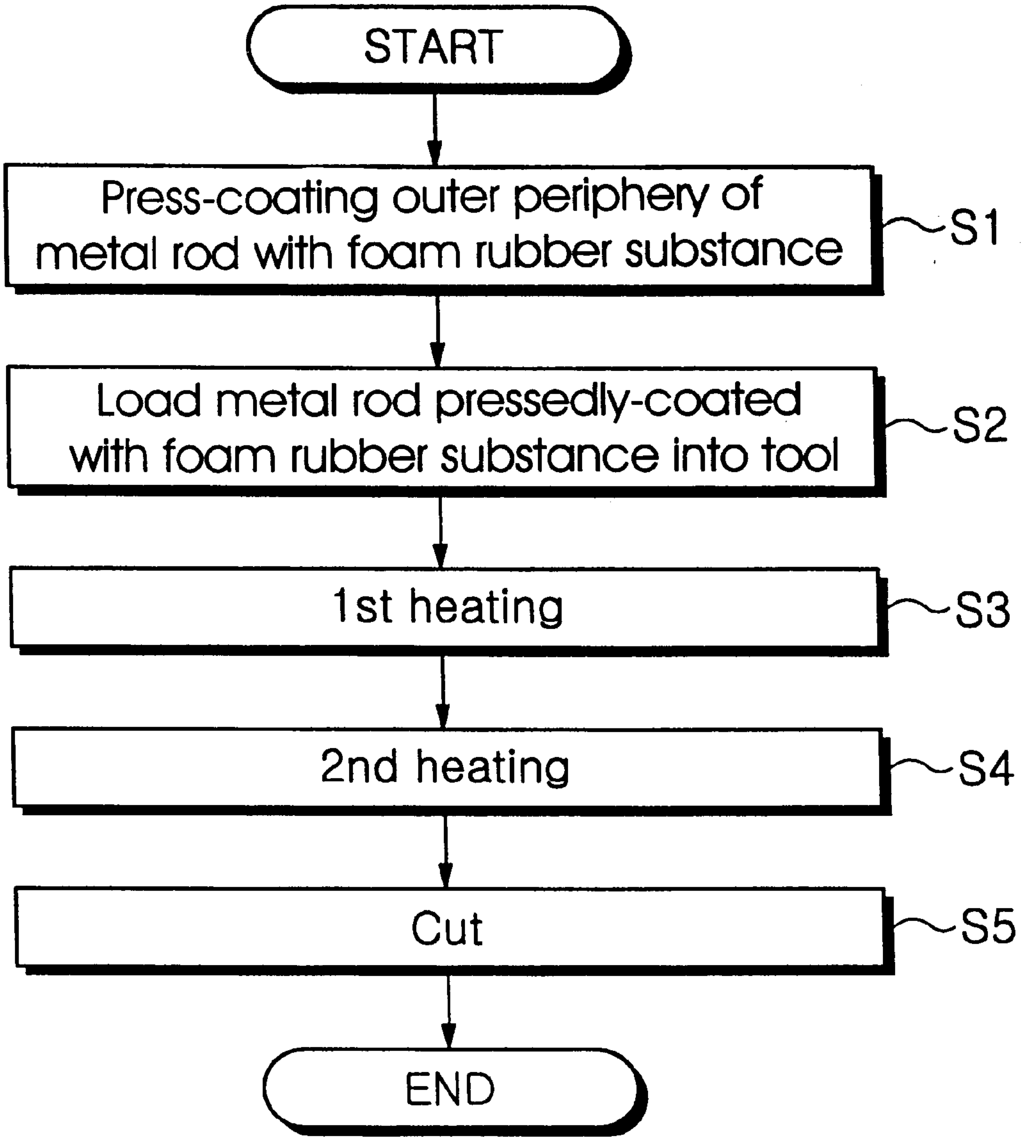
FIG. 1 is a flow diagram illustrating a method of manufacturing a charge roller of a developer for use of an image forming apparatus according to an embodiment of the present invention.
Figure 2A:
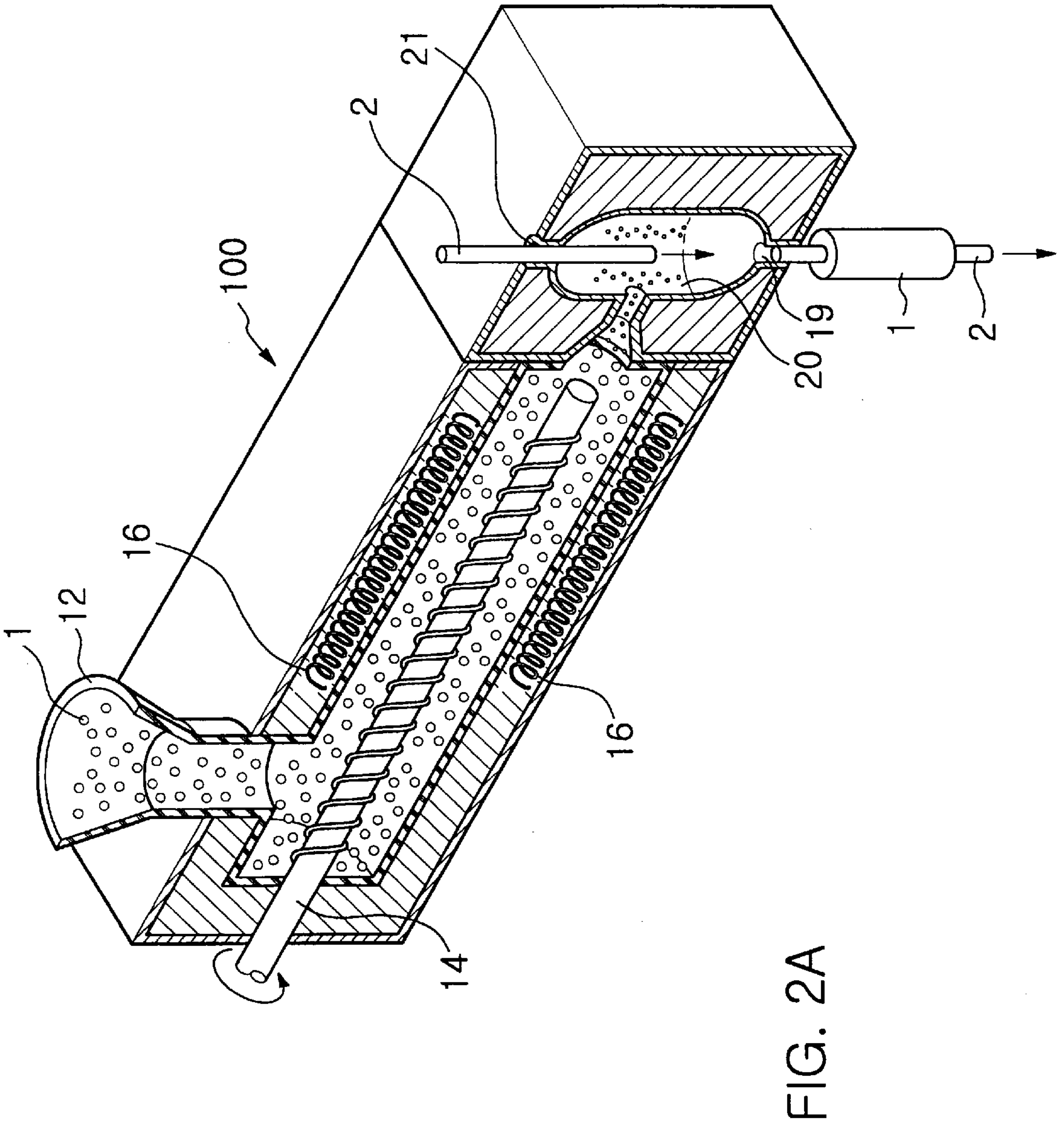
FIGS. 2*a* to 2*f* illustrate a process of manufacturing a charge roller of a developer for use of an image forming apparatus according to an embodiment of the present invention.

Referring to FIG. 1, a process of pressedly-coating an outer periphery of a metal rod with a foam rubber substance is performed (S1). In this case, as shown in FIG. 2*a,* a foam rubber substance 1 at a sheet phase is injected through a foam rubber substance inlet 12 of a compression molding machine 100, and a metal rod 2 having a predetermined diameter is inserted through a metal rod inlet 21.

Here, the foam rubber substance 1 injected through the inlet 12 is well mixed by a rotation of a mixing shaft 14 and pushed toward a cavity 20. Here, a plurality of heater coils 16 are disposed at a lower portion of the compression molding machine 100. The heater coils 16 serve to heat and melt down the mixed foam rubber substance 1.

When the metal rod 2 inserted through the metal rod inlet 21 reaches inside of the cavity 20, the melted foam rubber substance 1 pushed toward the cavity 20 is rapidly adhered to an outer periphery of the metal rod 2. Thus, the metal rod 2 extracted through a metal rod outlet 19 has an outer periphery pressedly-coated with the foam rubber substance 1.

According to an embodiment of the present invention, the foam rubber substance 1 pressedly-coated onto the outer periphery of the metal rod 2 consists of a mixture containing epichlorohydrin oxide rubber, acrylonitrile butadiene rubber, filler, cross linking agent and a blowing agent. Here, peroxide for example may be used as the cross linking agent, and 4,4'-oxybis(benzenesulfonylhydrazide) may be used as a blowing agent.

The mixing ratio of the epichlorohydrin oxide rubber and acrylonitrile butadiene rubber constituting a main composition of the foam rubber substance 1 is adjusted in advance so as to adjust a volume resistivity of the foam rubber substance 1 constituting an outer surface of a charge roller as a final product.

An epichlorohydrin oxide rubber and an acrylonitrile butadiene rubber are mixed at a ratio of 3:97 to 7:93, preferably at 5:95, thus permitting the foam rubber substance 1 constituting an outer periphery of a final product charge roller to be maintained at a volume resistivity of $10^7$ Ω cm to $10^8$ Ω cm.

Figure 2B:
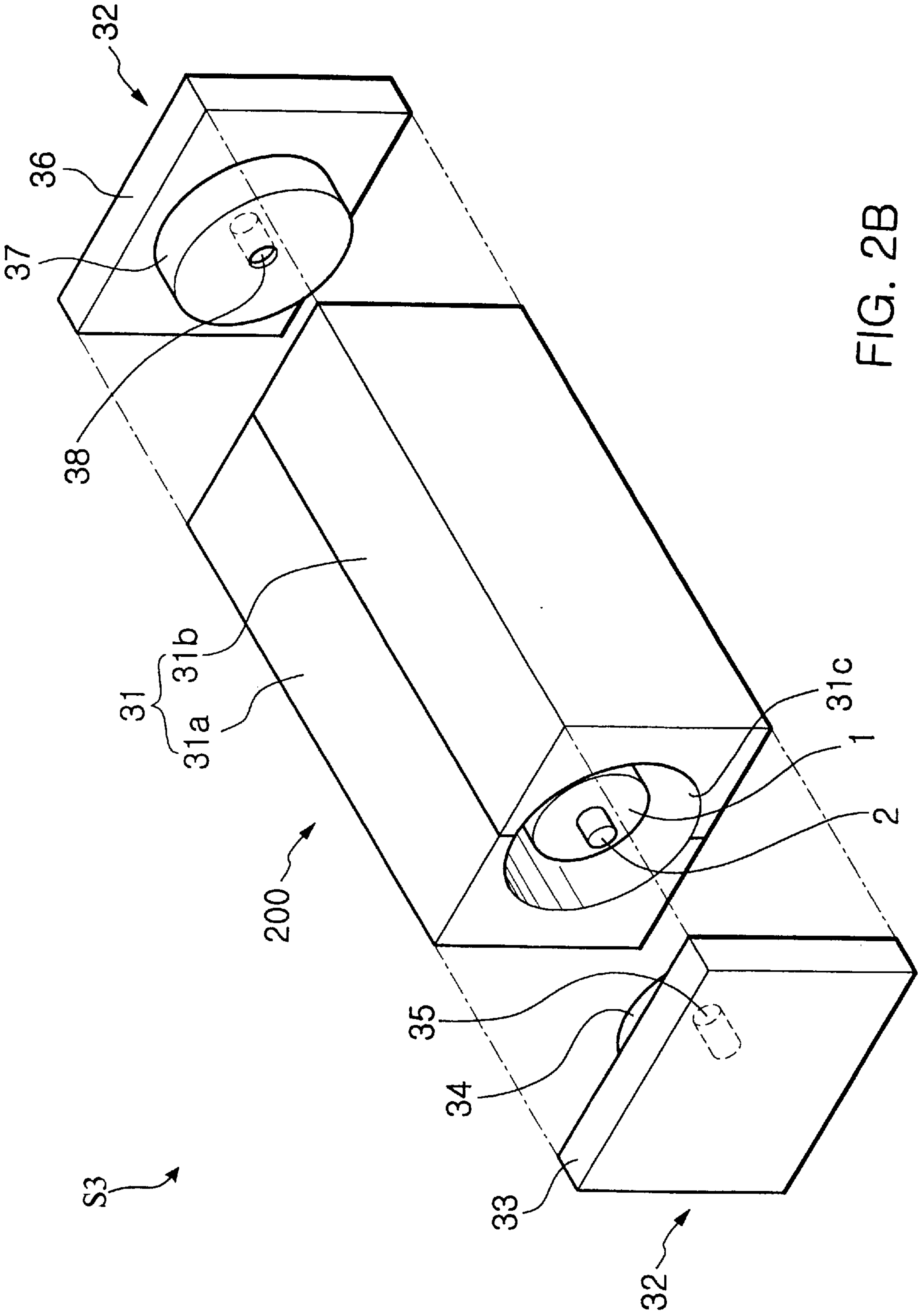

The subsequent process is performed for loading the metal rod 2 pressedly-coated with the foam rubber substance 1 into a receptor device for manufacturing a charge roller of the present invention (S2). Referring to FIG. 2*b,* a receptor device 200 according to an embodiment of the present invention includes a pipe-shaped main body 31 having both ends opened so as to define a receipt space 31*c,* and a pair of plugs 32 inserted into the both ends of the main body 31 for sealing the receipt space 31*c*. Here, the plugs 32 consists of cover plates 33, 36 and protrusions 34, 37 extended from the cover plates 33, 36.

The receptor device 200 for manufacturing a charge roller is configured in that left and right bodies 31*a,* 31*b* are coupled into a single unit. The left and right bodies 31*a,* 31*b* will be separated from each other when a first heating process which will be discussed later is completed, so that the metal rod 2 accommodated in the receipt space 31*c* of the main body 31 is rapidly transferred to outside.

The left and right bodies 31*a,* 31*b* will be coupled into one with the metal rod 2 pressedly-coated with the foam rubber substance 1 positioned therebetween so as to allow the metal rod 2 pressedly-coated with the foam rubber substance 1 to be housed within the receipt space 31*c* of the main body 31. Then, the plug 32 is employed to seal the both ends of the main body 31. In this case, the metal rod 2 has both ends coupled with fixing holes 35, 38 formed at protrusions 34, 37 of the plug 32 in such a manner that the metal rod 2 can be fixed within the main body 31 of the metal rod 2 with stability. Preferably, the main body 31 of the receptor device 200 is made up of one substance selected from among polytetrafluoro ethylene, polyimide, polyamide and polypropylenesulfide. These substances have extremely low thermal conductivity.

Figure 2C:
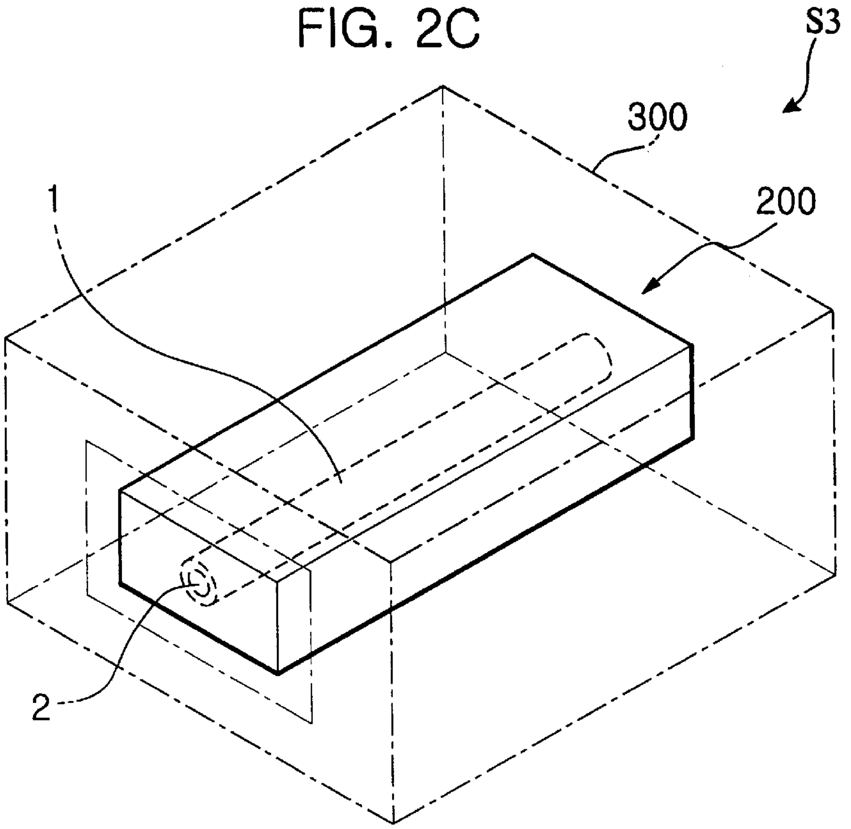
Figure 2D:
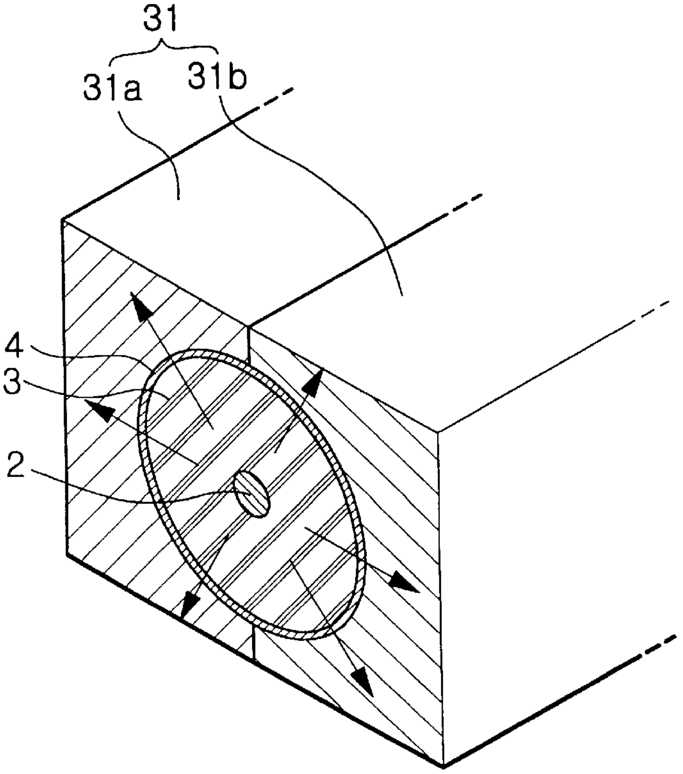

When the metal rod 2 is loaded into the receptor device 200 through the above-described processes, the foam rubber substance 1 coated at the outer periphery of the metal rod 2 is heated for the first time (S3). As shown in FIG. 2*c,* the receptor device 200 housed with the metal rod 2 is loaded into a dry heating furnace 300, and heat having a temperature of 130° C. to 150° C. is applied to an interior of the furnace 300. This first heating process is performed for a selected time period, for example, 15 minutes to 25 minutes. The foam rubber substance 1 contained in the main body 31 is rapidly expanded as illustrated by an arrow mark in FIG. 2*d,* by an action of the expanding agent 4,4'-oxybis (benzenesulfonylhydrazide) to thereby fill the receipt space 31*c* of the main body 31 during the first heating process.

At this time, since an outer surface of the foam rubber substance 1 is in contact with an inner wall of the receipt space 31*c* of the main body 31 consisting of polytetra fluoro ethylene, polyimide, polyamide or polypropylenesulfide having a low thermal conductivity, a semiconductive non-foamed rubber layer 4 is formed while an inner surface of the foam rubber substance 1 which is not in contact with the inner wall of the receipt space 31*c* of the main body 31 proceeds with smooth foaming process, thus forming a semiconductive foamed rubber layer 3.

Typically, a certain material passed through a foaming process has at a surface thereof a plurality of blow holes. Therefore, the foamed rubber layer contacting the printing medium (paper) may not be provided with a smooth surface unless an additional measure is taken to the outer surface of the blowing foam rubber substance 1 during a process according to a method of the present invention is performed. The foamed rubber layer will become an outer surface of a final product charge roller, therefore, if such layer is not a smooth surface, quality of the finally formed image may be deteriorated.

Considering such problems, the receptor device of the present invention has the main body 31 contacting the outer surface of the blowing foam rubber substance 1, the main body 31 being formed of material having a low thermal conductivity, for example, polytetrafluoroethylene, polyimide, polyamide or polypropylenesulfide. Thus, heat is uniformly transmitted onto an outer surface of the foam rubber substance 1 during the first heating process. Accordingly, the non-foamed rubber layer 4 with a predetermined thickness is formed at an outer surface of the foamed rubber layer 3, to thereby obtain a completed image with a high quality.

When the first heating process is performed, peroxide, i.e., cross linking agent, as well as the blowing agent makes a series of chemical reactions affecting other constituents of the foam rubber substance 1. For example, the peroxide agent rapidly cross-links molecular chains between the epichlorohydrin oxide rubber and acrylonitrile butadiene rubber forming a main composition of the foam rubber substance 1.

If such a crosslinking process is performed, an amount of the epichlorohydrin oxide rubber which existed as not being crosslinked is significantly reduced. Therefore, even if a charge roller of the present invention is in contact with a photosensitive drum for a long time period during a stoppage of operation of an image forming apparatus, the low molecular weight polymeric substance of the charge roller may not be migrated onto a surface of the photosensitive drum. As a result, the charge roller may not cause an abnormal phenomenon on the surface of the photosensitive drum.

In general, a certain material which has passed through a crosslinking process will have a significantly increased durability. Therefore, the charge roller contacting the printing medium(paper) will have an extremely high durability unless an additional measure is taken. If such is a case, it will be extremely difficult to maintain the durability of the charge roller at 40 or less as prescribed by JISA. This will also make it impossible to reduce the size of the charge roller.

In the present invention, a foaming process is performed simultaneously with the above-described cross linking process so as to suppress durability increasement of the final product charge roller. Thus, the charge roller may have a durability of 40 or less as prescribed by JISA, preferably 20 or less, allowing the charge roller to have a reduced size despite of the cross linking process. Typically, a charge roller with an excellent ability has a low volume resistivity, less amount of non-crosslinked rubber, and a low durability.

To produce such a charge roller with an excellent ability satisfying the above-mentioned condition, a method of the present invention mixes epichlorohydrin oxide rubber and acrylonitrile butadiene rubber at a mixing ratio of 5:95 so that the final product charge roller maintains a low volume resistivity of $10^7$ Ω cm to $10^8$ Ω cm.

A method according to an embodiment of the present invention does not add an additive which is different from an approach disclosed in U.S. Pat. No. 5,637,395, does not use a polyurethane which is different from an approach disclosed in U.S. Pat. No. 5,248,560, and does not perform a liquid coating process which is different from an approach disclosed in U.S. Pat. No. 5,786,091. Thus, a method of the present invention significantly reduces a volume resistivity of a charge roller while eliminating problems of nonuniformity of volume resistivity of a charge roller, increased product cost, and deterioration of overall product process efficiency.

In addition, a method according to an embodiment of the present invention employs a peroxide as a cross linking agent so as to rapidly cross-link molecular chains between the epichlorohydrin oxide rubber and acrylonitrile butadiene rubber forming a main composition of the foam rubber substance 1. Through such a crosslinking process, an amount of the epichlorohydrin oxide rubber which existed at a non-linked state is significantly reduced. Here, a method of the present invention allows the cross linking process and blowing process to be performed simultaneously so as to suppress excessive durability of a charge roller, maintaining the durability of the charge roller at 40 or less as prescribed by JISA.

A method of the present invention differs from approaches disclosed in U.S. Pat. Nos. 5,637,395, 5,497,219, and 5,786,091 in that the method of the present invention allows a cross linking process and a blowing process to be performed at the same time, thus suppressing increased durability of charge roller while increasing cross linked density of the final product charge roller. As a result, it will be possible to reduce the size of the charge roller despite of cross linking process being performed.

Figure 2E:
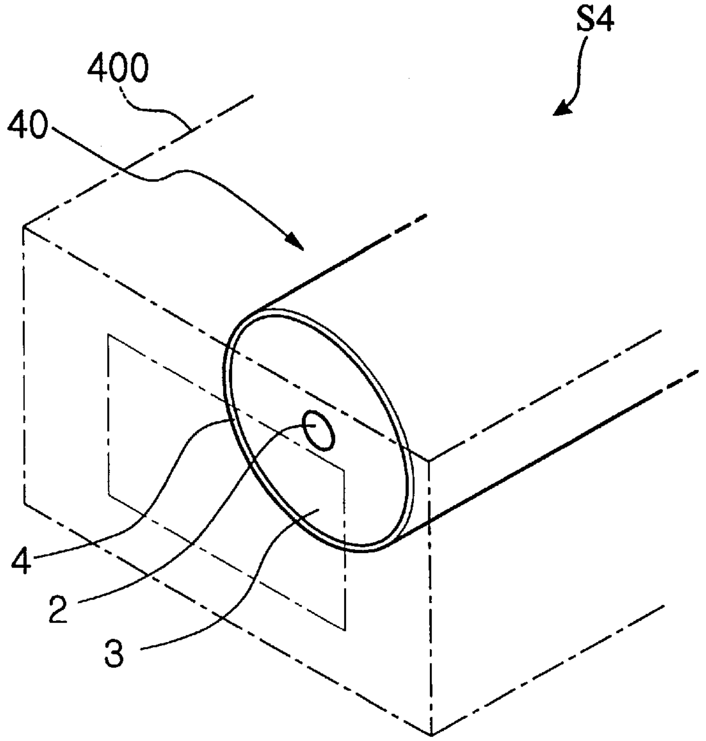
Figure 2F:
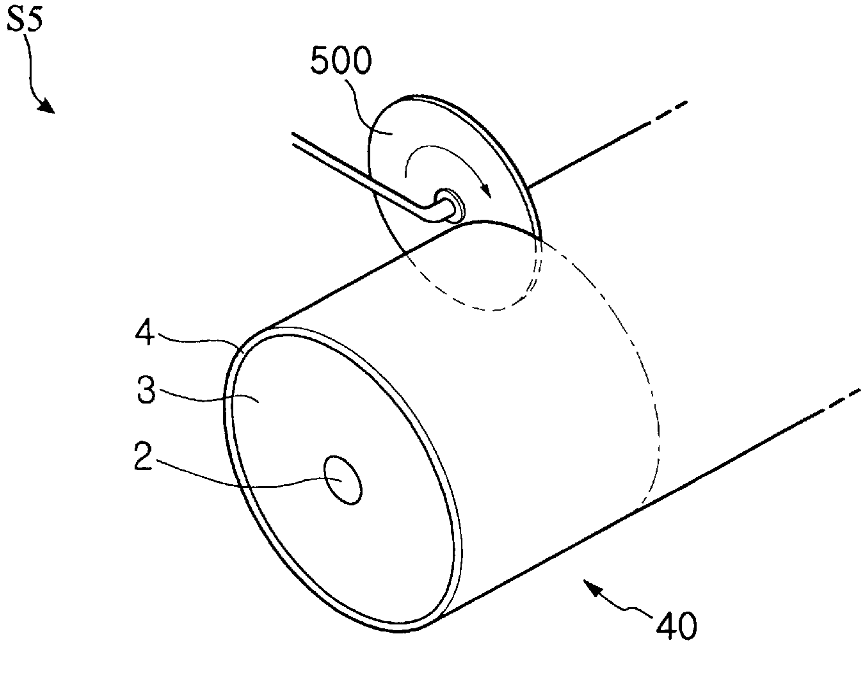

In the meantime, when the first heating the foam rubber substance is all finished, a second heating the foam rubber substance is performed (S4). First, the receptor device 200 for manufacturing a charge roller is extracted from the dry heating furnace 300. Subsequently, the main body 31 of the receptor device 200 is disassembled so as to take out the metal rod 2. Then, as shown in FIG. 2*e,* the metal rod 2 is loaded into a dry heating furnace 400, and heat having a temperature of approximately 130° C. to 150° C. is applied into the furnace 400. This second heating process is performed for a selected time period, for example, 15 to 25 minutes.

During such a second heating process, the residual cross linking agent which does not join the above-described cross linking process will be completely removed.

When the second heating process is all finished, the metal rod 2 having the non-foamed rubber layer 4 and the foamed rubber 3 formed in sequence is cut into a predetermined size (S5).

Figure 3:
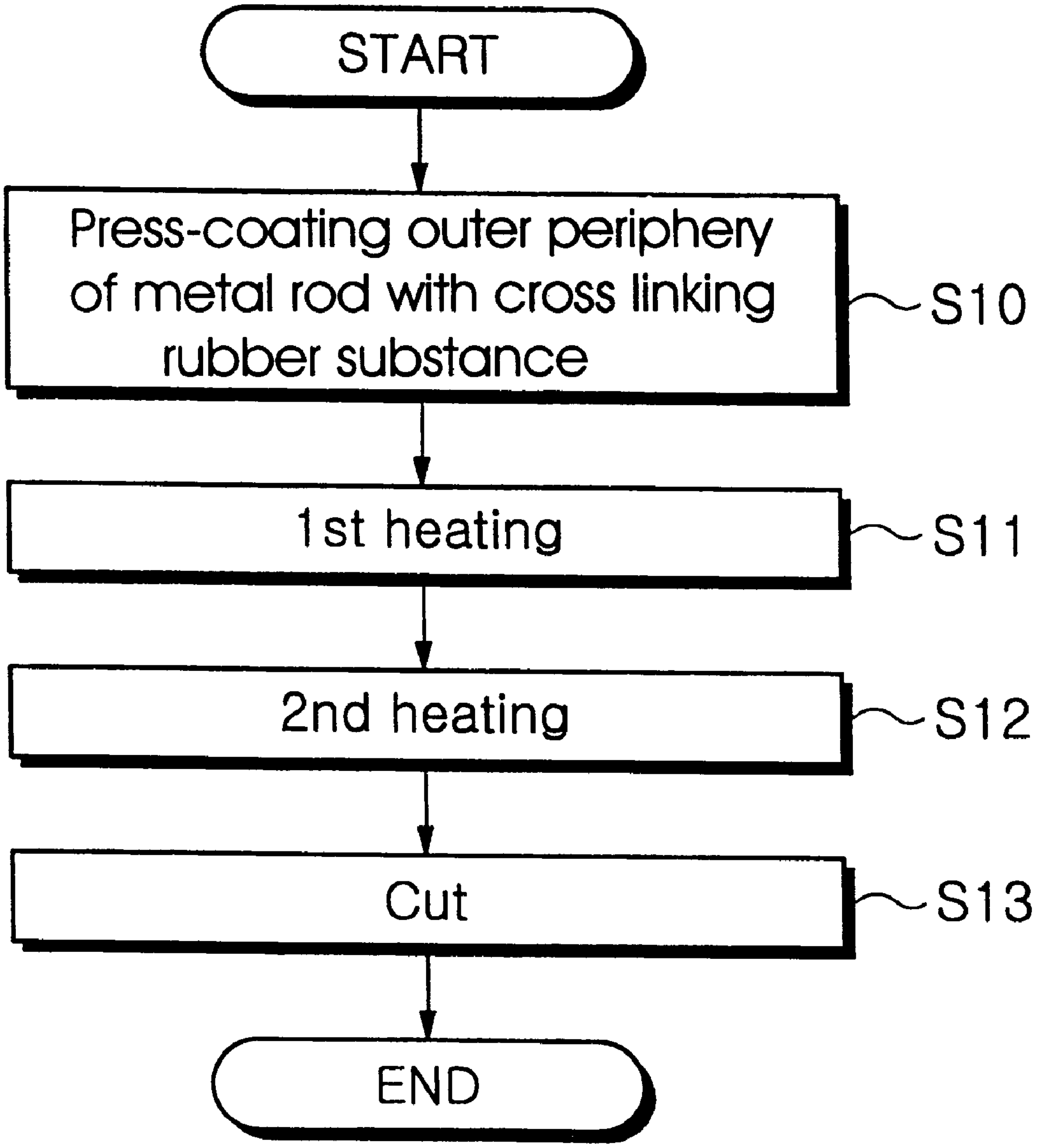
FIG. 3 is a flow diagram illustrating a method of manufacturing a charge roller of a developer for use of an image forming apparatus according to another embodiment of the present invention.
Figure 4A:
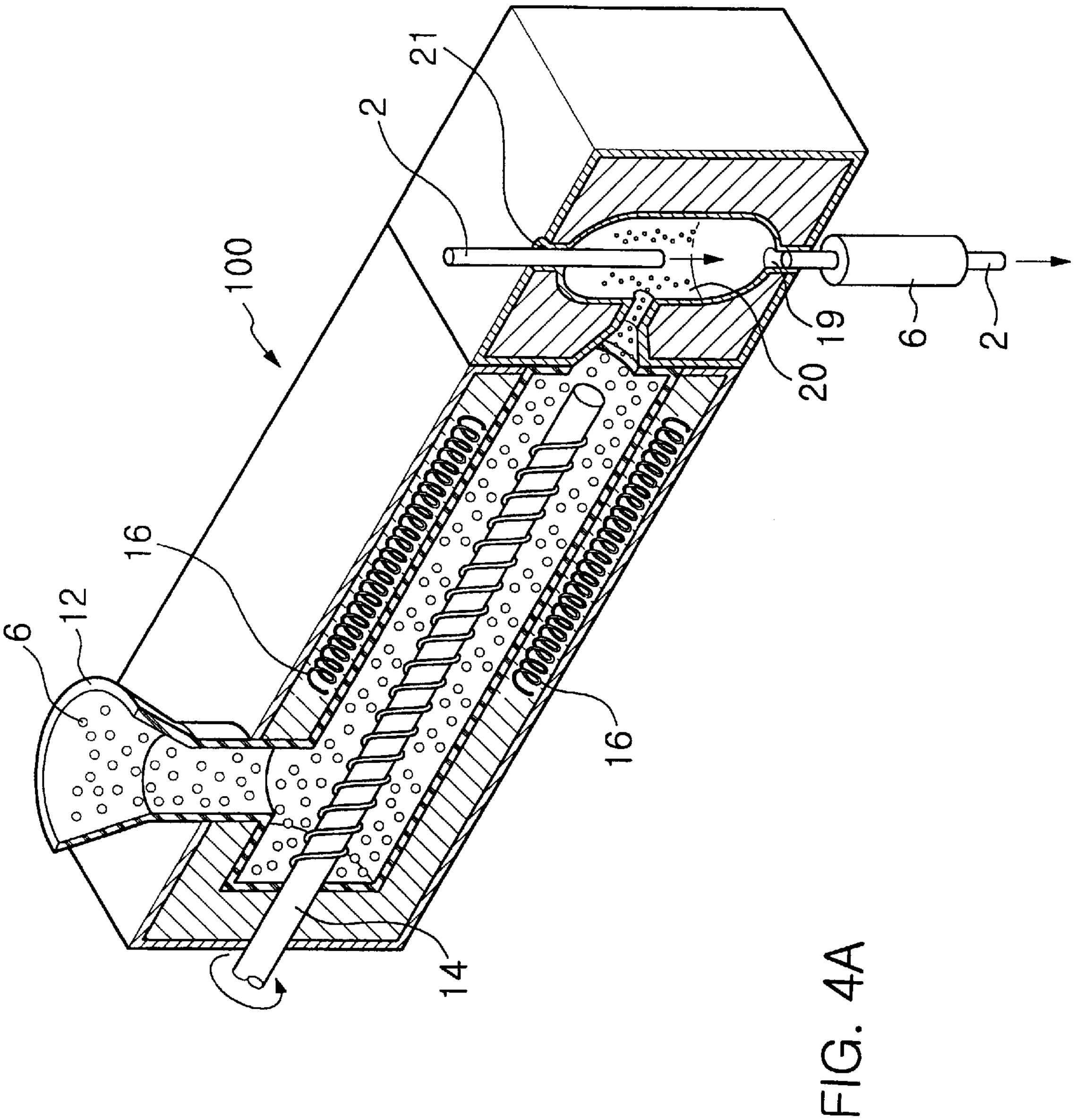
FIGS. 4*a* to 4*d* illustrate a process of manufacturing a charge roller of a developer for use of an image forming apparatus according to another embodiment of the present invention.

As another embodiment of the present invention, a process of manufacturing a charge roller mainly utilizing a cross linking rubber substance will be explained hereinafter. As shown in FIG. 3, firstly, a process of pressedly-coating an outer periphery of a metal rod is performed (S10). In this case, as shown in FIG. 4*a,* a crosslinking rubber substance 6 at a sheet phase is injected through the foam rubber substance inlet 12 of the compression molding machine 100, and the metal rod 2 having a predetermined diameter is inserted through the metal rod inlet 21.

Here, the crosslinking rubber substance 6 injected through the inlet 12 is well mixed by a rotation of a mixing shaft 14 and pushed toward the cavity 20. Here, a plurality of heater coils 16 are disposed at a lower portion of the compression molding machine 100. The heater coils 16 serve to heat and melt down the mixed crosslinking rubber substance 6.

When the metal rod 2 inserted through the metal rod inlet 21 reaches inside of the cavity 20, the melted crosslinking rubber substance 6 being pushed toward the cavity 20 is rapidly adhered to an outer periphery of the metal rod 2. Thus, the metal rod 2 extracted through the metal rod outlet 19 has an outer periphery pressedly-coated with the crosslinking rubber substance 6.

According to another embodiment of the present invention, the crosslinking rubber substance 6 pressedly-coated onto the outer periphery of the metal rod 2 consists of a mixture containing epichlorohydrin oxide rubber, acrylonitrile butadiene rubber, and a cross linking agent. Here, peroxide, for example, dicumyl peroxide or benzoyl peroxide, is used as a cross linking agent.

The crosslinking rubber substance 6 is added with $CaCO_3$ serving as a stabilizing agent for leading the above-described extrusion process to be performed with stability, while serving as an agent for improving an overall abrasive quality of the crosslinking rubber substance 6. The crosslinking rubber substance 6 is further added with a sulfur as a cross linkage accelerating agent which serves to maximize cross linking action of the peroxide. In addition, the crosslinking rubber substance 6 is further added with a co-cross linking agent, for example, triallylisocyanurate along with $CaCO_3$ and cross linkage accelerating agent. The triallylisocyanurate serves to adjust a half-life period of the peroxide used as a cross linking agent. By adding the triallylisocyanurate, the above-described peroxide can maintain a half-life period of 30 minutes or longer at an atmosphere pressure of 100° C. The cross linking rubber substance 6 is further added with a carbon black which serves as a kind of pigment. Here, an epichlorohydrin oxide rubber and acrylonitrile butadiene rubber constituting a main composition of the cross linking rubber substance 6 is made up of a polar lower polymeric substance so as to adjust in advance a volume resistivity of the crosslinking rubber substance 6 constituting an outer surface of a charge roller as a final product.

The crosslinking rubber substance has, as a main composition thereof, an epichlorohydrin oxide rubber having a content of chloride maintained at 50% or less, a weight average molecular weight of 1,000 to 1,000,000, and a number average molecular weight of 10,000, and an acrylonitrile butadiene rubber having a content of acrylonitrile maintained at 50% or less, a weight average molecular weight of 1,000 to 1,000,000, and a number average molecular weight of 10,000, thus allowing the crosslinking rubber substance forming an outer surface of a charge roller as a final product to be maintained at a volume resistivity of $10^7$ Ω cm to $10^8$ Ω cm. Here, the acrylonitrile butadiene rubber has a weight which occupies 60% to 95% of the total weight of epichlorohydrin oxide rubber and an acrylonitrile butadiene rubber.

The constituents of the crosslinking rubber substance 6 may have a variety of combination ratio in accordance with the condition of production system, as shown in the following four tables.

TABLE 1

| Constituents | Additive amount |
|---|---|
| Acrylonitrile butadiene rubber | 20 |
| Epichlorohydrin oxide rubber | 80 |
| Dicumyl peroxide | 1.25 |
| $CaCO_3$ | 30 |
| Carbon black | 1 |

TABLE 2

| Constituents | Additive amount |
|---|---|
| Acrylonitrile butadiene rubber | 10 |
| Epichlorohydrin oxide rubber | 90 |
| Dicumyl peroxide | 1.25 |
| $CaCO_3$ | 30 |
| Carbon black | 1 |

TABLE 3

| Constituents | Additive amount |
|---|---|
| Acrylonitrile butadiene rubber | 20 |
| Epichlorohydrin oxide rubber | 80 |
| Dicumyl peroxide | 1.25 |
| Benzoyl peroxide | 0.5 |
| Triallylisocyanurate | 1 |
| $CaCO_3$ | 30 |
| Carbon black | 1 |

TABLE 4

| Constituents | Additive amount |
|---|---|
| Acrylonitrile butadiene rubber | 20 |
| Epichlorohydrin oxide rubber | 80 |
| Dicumyl peroxide | 1.25 |
| Benzoyl peroxide | 0.5 |
| Sulfur | 1 |
| $CaCO_3$ | 30 |
| Carbon black | 1 |

When the process of pressedly-coating an outer periphery of the metal rod 2 with the crosslinking rubber substance 6 is all completed, a process of firstly heating the crosslinking rubber substance 6 is performed (S11).

Figure 4B:
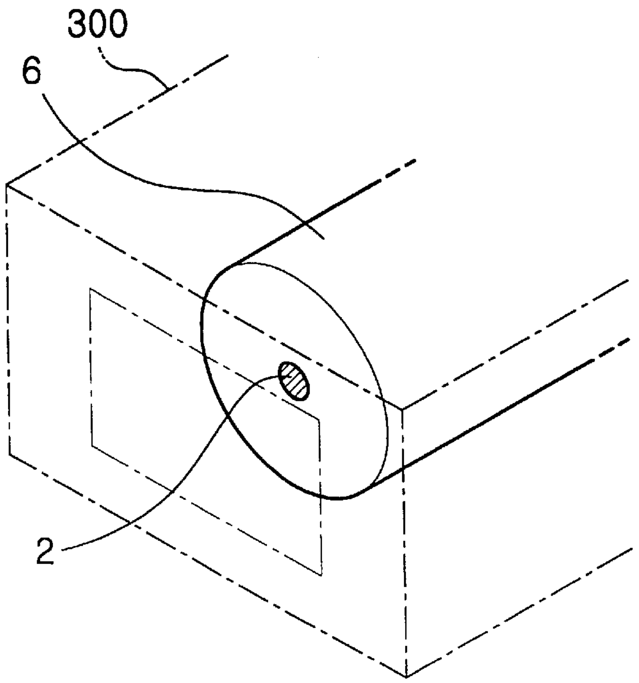

As shown in FIG. 4*b*, the metal rod 2 coated with the crosslinking rubber substance 6 is loaded into the dry heating furnace 300, and heat having a temperature of 130° C. to 150° C. is applied to an interior of the dry heating furnace 300. This first heating process is performed during a time period of 55 to 65 minutes, for example.

Figure 4C:
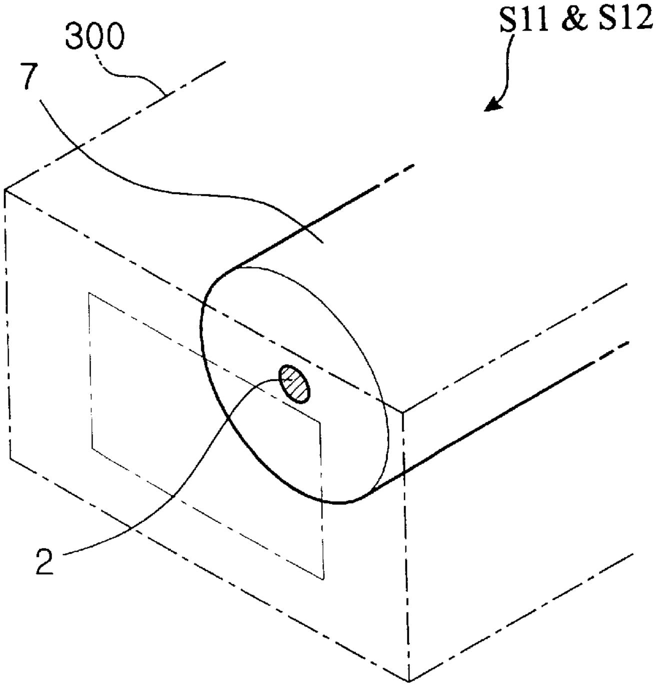

During the first heating process, the peroxide, i.e., cross linking agent, contained in the crosslinking rubber substance 6 rapidly cross-links the epichlorohydrin oxide rubber and acrylonitrile butadiene rubber forming a main composition of the crosslinking rubber substance 6, thus forming a crosslinked rubber layer 7 at an outer periphery of the metal rod 2, as shown in FIG. 4*c*.

If such a crosslinking process is performed, an amount of the epichlorohydrin oxide rubber which existed as not being crosslinked is significantly reduced. Therefore, even if a charge roller of the present invention is in contact with a photosensitive drum for a long time period during a stoppage of operation of an image forming apparatus, the low molecular polymeric substance existing at the charge roller may not be migrated onto a surface of the photosensitive drum. As a result, the charge roller may not cause an abnormal phenomenon on the surface of the photosensitive drum.

Typically, a certain material which has passed through a crosslinking process will have a significantly increased durability. Therefore, the charge roller contacting the printing medium (paper) will have an extremely high durability unless an additional measure is taken. If such is a case, it will be extremely difficult to maintain the durability of the charge roller at 40 or less as prescribed by JISA. This will also make it impossible to reduce the size of the charge roller.

However, a method of the present invention employs epichlorohydrin oxide rubber and acrylonitrile butadiene rubber forming a main composition of the crosslinking rubber substance 6, selected from a polar low molecular weight polymeric substance which may not be affected by a crosslinking process so as to suppress excessive durability of the final product charge roller. Thus, the charge roller may have a durability of 40 or less as prescribed by JISA, preferably 20 or less, while making it possible to reduce size of the charge roller despite of the cross linking process.

As aforementioned, a charge roller with an excellent ability has a low volume resistivity, less amount of non-crosslinked rubber, and a low durability. To produce such a charge roller with an excellent ability satisfying the above-mentioned condition, a method according to another embodiment of the present invention uses as a main composition epichlorohydrin oxide rubber and acrylonitrile butadiene rubber constituted by a polar low molecular polymeric substance so that the final product charge roller maintains a low volume resistivity of $10^7$ Ω cm to $10^8$ Ω cm.

A method according to another embodiment of the present invention does not add an additive differently from an approach disclosed in U.S. Pat. No. 5,637,395, does not use a polyurethane differently from an approach disclosed in U.S. Pat. No. 5,248,560, and does not perform a liquid coating process differently from an approach disclosed in U.S. Pat. No. 5,786,091. Thus, a method according to another embodiment of the present invention significantly reduces a volume resistivity of a charge roller while eliminating problems of nonuniformity of volume resistivity of a charge roller, product cost increasement, and deterioration of overall product process efficiency.

In addition, a method of the present invention employs peroxide as a cross linking agent so as to rapidly cross-link molecular chains between the epichlorohydrin oxide rubber and acrylonitrile butadiene rubber forming a main composition of the crosslinking rubber substance 6. Through such a crosslinking process, an amount of the epichlorohydrin oxide rubber which existed at a non-linked state is significantly reduced. In this case, the low molecular polymeric substance existing at the final product charge roller may not be migrated onto a surface of the photosensitive drum. As a result, the charge roller may not cause an abnormal phenomenon on the surface of the photosensitive drum.

A method according to another embodiment of the present invention differs from approaches disclosed in U.S. Pat. Nos. 5,637,395, 5,497,219, and 5,786,091 in that the method of the present invention employs epichlorohydrin oxide rubber and acrylonitrile butadiene rubber which do not affected by a crosslinking process as a main composition of the crosslinking rubber substance 6, thus suppressing increased durability of charge roller while increasing cross linked density of the final product charge roller. As a result, it will be possible to reduce the size of the charge roller despite of cross linking process being performed.

In the meantime, when the first heating the crosslinking rubber substance is all finished, a second heating process of the crosslinking rubber substance is performed (S12). This second heating process is performed in such a manner that heat having a temperature of approximately 100° C. to 120° C. is heated into an interior of the furnace 300 with the metal rod 2 accommodated therein. This second heating process is performed for 4 to 12 hours, for example. During such a second heating process, the residual cross linking agent which did not join the above-described cross linking process will be completely removed.

When the second heating process is all finished, the metal rod 2 having the crosslinked rubber layer 7 is cut into a predetermined size (S13).

Figure 4D:
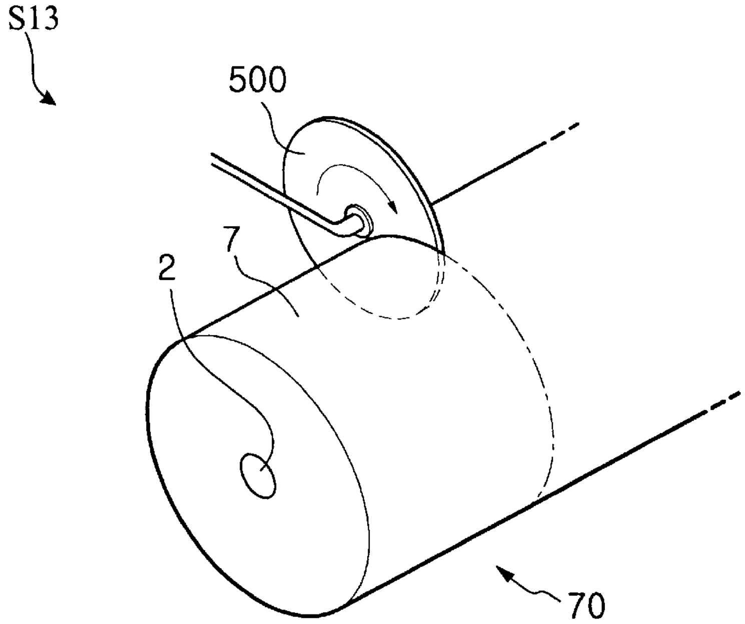

As shown in FIG. 4*d*, a blade 500 rotating at a high speed is employed for cutting the metal rod 2 into regular size, thereby completing a process of manufacturing a charge roller 70 of a developer for image forming apparatus.

Figure 5:
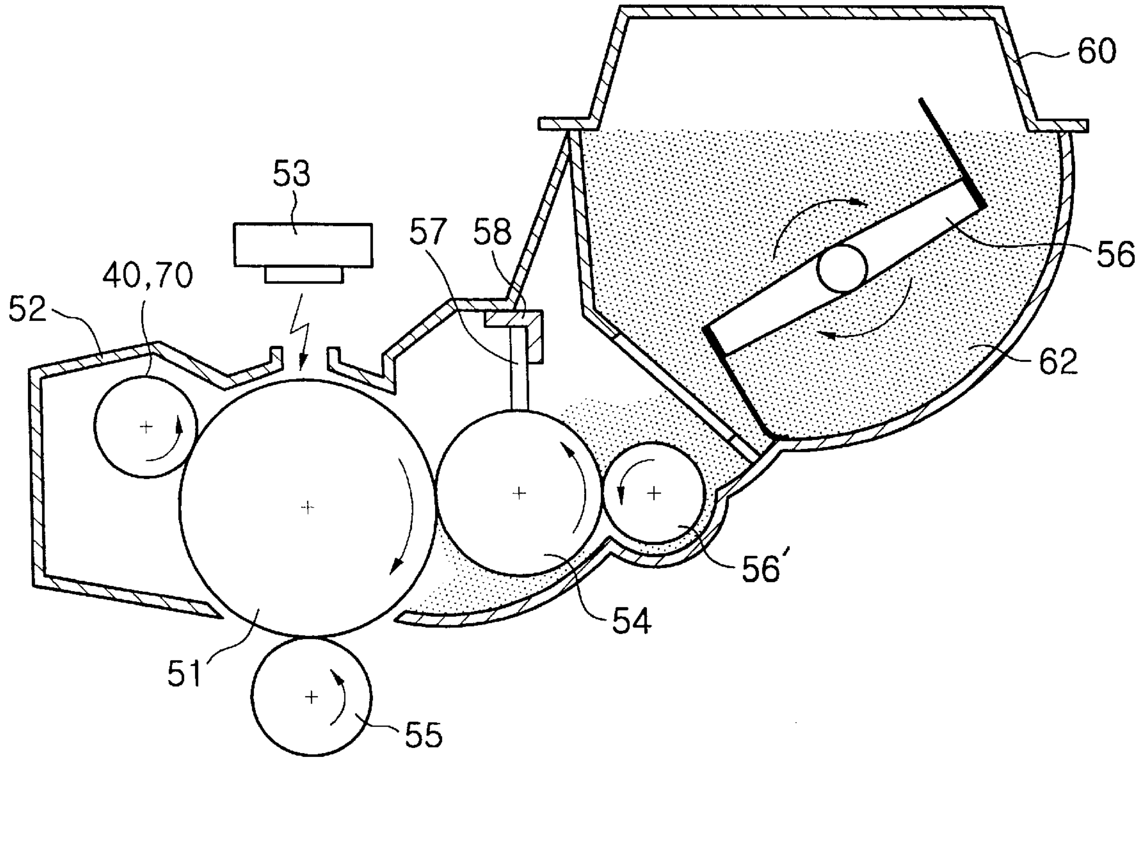
FIG. 5 illustrates a developer for use of an image forming apparatus mounted with a charge roller manufactured according to embodiments of the present invention.

Referring to FIG. 5, a developer for use of image forming apparatus is configured in that a photosensitive drum 51 rotating at a regular speed is arranged within a frame 52, wherein the drum 51 rotates as being engaged with charge rollers 40, 70 manufactured according to embodiments of the present invention. Here, charge rollers 40, 70 serve to charge the surface of the photosensitive drum 51 with a high voltage.

At this time, an exposer 53 installed above the photosensitive drum 51 radiates light onto the drum 51 which is charge-completed by the charge rollers 40, 70 so as to allow the electrostatic latent image formed at the drum 51 to be rapidly exposed to the light. In addition, a printing roller 55 installed beneath the photosensitive drum 51 rotates as being engaged with the drum 51 so as to allow the completely formed image to be printed onto a recording medium supplied from outside.

As shown in FIG. 5, a toner cartridge 60 is mounted to a portion of the frame 52, and a stirring member 56 for stirring the fed toner 62 is installed to the cartridge 60. In this case, the stirring member 56 also serves to supply the stirred toner 62 to a supply roller 56'.

The photosensitive roller 51 rotates with charging rollers 40, 70 as being engaged thereto, and also rotates with a developing roller 54 as being engaged thereto. The developing roller 54 rotates with the supply roller 56' which is fed with the toner 62 from the stirring member 56.

The developing roller 54 serves to fix the toner supplied from the supply roller 56' onto the photosensitive drum 52 where an electrostatic latent image is formed. In this case, a blade 57 is fixed onto the developing roller 54 by a fixing protrusion 58 so as to restrict the thickness of the toner 62 supplied to the drum 51 at a predetermined height.

If charge rollers 40, 70 have volume resistivity of $10^8$ Ω cm or higher, an excessively high voltage is required for charging the surface of the drum 51. If such is a case, an amount of ozone generated by a high voltage applied will be significantly increased, thereby causing a series environmental pollution.

However, a method of the present invention manufactures the charge roller 40 utilizing a foam rubber substance where epichlorohydrin oxide rubber and an acrylonitrile butadiene rubber are mixed at a ratio of 5:95, and the charge roller 70 utilizing a crosslinking rubber substance consisting of epichlorohydrin oxide rubber and acrylonitrile butadiene rubber having a low molecular polymeric characteristic, thus allowing the charge rollers 40, 70 to maintain a low volume resistivity of $10^7$ Ω cm to $10^8$ Ω cm. As a result, the surface of the photosensitive drum 51 can be charged by a minimum charging voltage, to thereby significantly reduce an amount of ozone.

As described above, the present invention is advantageous in that a semiconductive resilient rubber layer is formed of a double layer constituted by a foam rubber layer and a non-foam rubber layer, or a single layer of a cross linking rubber layer, to thereby minimize volume resistivity of the semiconductive resilient rubber layer, maximize crosslinking ratio of molecule of rubber, and suppress increase of durability of the semiconductive resilient rubber layer.

The present invention presents an overall effectiveness for a variety of image forming apparatuses. Although the invention has been described with reference to particular embodiments, it will be apparent to one of ordinary skill in the art that modifications to the described embodiments may be made without departing from the spirit and scope of the invention. Thus, the true technical protection scope of the present invention must be determined by the attached claims.

What is claimed is:

1. A method of manufacturing a charge roller of a developer for use of an image forming apparatus, said method comprising the steps of:

providing a pipe-shaped main body having both ends opened so as to define a receipt space;

providing a pair of plugs inserted into said both ends of said main body for sealing said receipt space, wherein, said main body is made of high molecular polymeric substance with a low thermal conductivity;

pressedly-coating an outer periphery of a metal rod with a foam rubber substance;

loading said metal rod into the receipt space of the main body to form a receptor device;

applying a first heat to said receptor device comprising the foam rubber substance;

taking said metal rod pressedly-coated with the firstly heated foam rubber substance out from the receipt space of the main body of the receptor device;

applying a second heat to the metal rod pressedly coated with said firstly heated foam rubber substance that was heated by said first heat; and cutting the metal rod pressedly-coated with the twice heated foam rubber substance into a predetermined width.

2. The method according to claim 1, wherein said foam rubber substance is made up of a combination including epichlorohydrin oxide rubber, acrylonitrile butadiene rubber, filler, cross linking agent and blowing agent.

3. The method according to claim 2, wherein said epichlorohydrin oxide rubber and acrylonitrile butadiene rubber are mixed with an adjusted mixing ratio so as to adjust in advance a volume resistivity of said foam rubber substance.

4. The method according to claim 3, wherein said epichlorohydrin oxide rubber and acrylonitrile butadiene rubber are mixed with a ratio of 3:97 to 7:93.

5. The method according to claim 2, wherein said cross linking agent is a peroxide.

6. The method according to claim 2, wherein said blowing agent is 4,4'-oxybis(benzenesulfonylhydrazide).

7. The method according to claim 1, wherein said first and second heating steps are performed by a dry heating method.

8. The method according to claim 1, wherein said first heating step is performed at a temperature of 130° C. to 150° C. for 15 to 25 minutes.

9. A method of manufacturing a charge roller of a developer for use of an image forming apparatus, said method comprising the steps of:

pressedly-coating an outer periphery of a metal rod with a crosslinking rubber substance;

applying a first heat to said crosslinking rubber substance;

applying a second heat the crosslinking rubber substance; and cutting the metal rod pressedly-coated with the twice heated crosslinking rubber substance into a predetermined width.

10. The method according to claim 9, wherein said crosslinking rubber substance is made up of a combination including a polar low molecular polymeric epichlorohydrin oxide rubber, a polar low molecular polymeric acrylonitrile butadiene rubber, and cross linking agent.

11. The method according to claim 10, wherein said polar low molecular polymeric epichlorohydrin oxide rubber has a content of chloride of 50% or less and a weight average molecular weight of 1,000 to 1,000,000.

12. The method according to claim 10, wherein said polar low molecular polymeric acrylonitrile butadiene rubber has a content of acrylonitrile of 50% or less and a weight average molecular weight of 1,000 to 1,000,000.

13. The method according to claim 10, wherein said polar low molecular polymeric acrylonitrile butadiene rubber has a weight percent occupying 60% to 95% of a total weight of said epichlorohydrin oxide rubber and said acrylonitrile butadiene rubber.

14. The method according to claim 10, wherein said cross linking agent is a peroxide.

15. The method according to claim 14, wherein said peroxide is made up of a combination including dicumyl peroxide and benzoyl peroxide.

16. The method according to claim 14, wherein said peroxide maintains a half-life period of 30 minutes or longer at an atmosphere pressure of 100° C.

17. The method according to claim 10, wherein said crosslinking rubber substance is further added with $CaCO_3$.

18. The method according to claim 10, wherein said crosslinking rubber substance is further added with a crosslinkage accelerating agent.

19. The method according to claim 18, wherein said crosslinkage accelerating agent is sulfur.

20. The method according to claim 10, wherein said crosslinking rubber substance is further added with a co-cross linking agent is a peroxide.

21. The method according to claim 20, wherein said co-cross linking agent is triallylisocyanurate.

22. The method according to claim 9, wherein said first and second heating steps are performed by a dry heating method.

23. The method according to claim 9, wherein said first heating step is performed at a temperature of 140° C. to 160° C. for 55 to 65 minutes.

24. The method according to claim 9, wherein said second heating step is performed at a temperature of 100° C. to 120° C. for 4 to 12 hours.

25. The method of claim 1, further comprising the step of applying an expanding agent to said foam rubber substance before applying said first heat causing said foam rubber substance to expand and completely fill said receipt space during said first heating.

26. The method of claim 25, said expanding agent being 4,4'-oxybis (benzenesulfonylhydrazide).

27. The method of claim 1, said first heat being applied by a first furnace that accommodates said receptor device and said second heat being applied by a second furnace absent a void that accommodates said receptor device.

28. A method of manufacturing a charging roller for use in an image forming apparatus, said method comprising the steps of:

pressedly-coating an outer periphery of a metal rod with a rubber substance;

applying a first heat for a first duration of time by a first furnace to said metal rod coated by said rubber substance;

applying a second heat for a second duration of time by a second furnace to said firstly heated metal rod coated by said rubber substance; and cutting said twice heated metal rod coated by said rubber substance into a predetermined width.

29. The method of claim 28, said rubber substance being a foam rubber substance.

30. The method of claim 29, further comprising the step of applying an expanding agent to said foam rubber substance before applying said first heat causing said foam rubber substance to expand and completely fill a receipt space during said first heating.

31. The method of claim 30, said expanding agent being 4,4'-oxybis(benzenesulfonylhydrazide).

32. The method of claim 30, said application of said first heat to said foam rubber substance causes an outer circumference to be a non-foamed rubber layer having a predetermined thickness.

33. The method of claim 32, said first heat being applied by a first furnace that accommodates a receptor device that provides a receipt space allowing said foam rubber to expand, and said second heat being applied by a second furnace absent a void that accommodates said receptor device.

34. The method of claim 32, said first duration being 15 to 25 minutes and said first heat being 130° C. to 150° C.

35. The method of claim 22, said second duration being 15 to 25 minutes and said second heat being 130° C. to 150° C.

36. The method of claim 28, said rubber substance being a crosslinking rubber substance comprising a peroxide.

37. The method of claim 36, said first heat being between 130° C. to 150° C. and said first duration being between 55 and 65 minutes.

38. The method of claim 36, said second heat being between 100° C. to 120° C. and said second duration being between 4 and 12 hours.

39. The method of claim 36, said first furnace being identical to said second furnace.

* * * * *